(12) United States Patent
Lu et al.

(10) Patent No.: US 7,786,646 B2
(45) Date of Patent: *Aug. 31, 2010

(54) MAGNETIC FORCE ROTATION DEVICE

(75) Inventors: Weiting Lu, Tainan (TW); Hsiaoting Lu, No. 21, Lane 154, Nantai Street, Yongkang City, Tainan County 710 (TW)

(73) Assignees: Union Plastic (Hangzhou) Machinery Co., Ltd., Zhejiang (CN); Hsiaoting Lu, Tainan (TW)

( * ) Notice: Subject to any disclaimer, the term of this patent is extended or adjusted under 35 U.S.C. 154(b) by 277 days.

This patent is subject to a terminal disclaimer.

(21) Appl. No.: 12/093,325

(22) PCT Filed: Apr. 1, 2007

(86) PCT No.: PCT/CN2007/000010

§ 371 (c)(1),
(2), (4) Date: May 11, 2008

(87) PCT Pub. No.: WO2007/082457

PCT Pub. Date: Jul. 26, 2007

(65) Prior Publication Data

US 2008/0278019 A1  Nov. 13, 2008

(30) Foreign Application Priority Data

Jan. 16, 2006 (CN) .................. 2006 1 0033053

(51) Int. Cl.
*H02K 1/00* (2006.01)
*H02K 21/12* (2006.01)

(52) U.S. Cl. .................. 310/216.079; 310/156.32; 310/266

(58) Field of Classification Search ............ 310/156.02, 310/156.32–156.39, 216.074, 216.079, 265–266
See application file for complete search history.

(56) References Cited

U.S. PATENT DOCUMENTS

| | | | |
|---|---|---|---|
| 5,625,241 A * | 4/1997 | Ewing et al. | 310/156.37 |
| 5,696,419 A * | 12/1997 | Rakestraw et al. | 310/268 |
| 5,786,645 A * | 7/1998 | Obidniak | 310/68 R |
| 6,323,576 B1 * | 11/2001 | Applegate | 310/268 |
| 6,762,525 B1 * | 7/2004 | Maslov et al. | 310/112 |
| 6,791,222 B1 * | 9/2004 | Maslov et al. | 310/156.38 |
| 6,891,306 B1 * | 5/2005 | Soghomonian et al. | 310/216.092 |
| 7,554,241 B2 * | 6/2009 | Rao | 310/266 |

* cited by examiner

*Primary Examiner*—Tran N Nguyen
(74) *Attorney, Agent, or Firm*—Banger Shia

(57) ABSTRACT

A magnetic force rotation device includes a rotor and a stator. The rotor is provided with a plurality of magnetic assemblies containing permanent magnet. The plurality of magnetic assemblies are arranged along the circumferential direction of the rotating shaft to form a wheel-shaped ring, and each magnetic assembly is provided with two magnetic poles. The stator is provided with a plurality of magnetically isolated electromagnets coaxially arranged. The electromagnets form a wheel-shaped ring around the rotating shaft, and each electromagnet is provided with paired poles. The wheel-shaped ring of the stator is at least party surrounded by the wheel-shaped ring of the rotor, so that each pole of the paired poles of the electromagnets of the stator corresponds to one magnetic pole of the two magnetic poles of the magnetic assemblies of the rotor respectively. Two axial component air gaps are provided between the rotor and the stator. One of the above two axial component air gaps and two radial component air gaps are provided between one of the paired poles of the electromagnets of the stator and one corresponding magnetic pole of the two magnetic poles of the magnetic assemblies of the rotor.

15 Claims, 11 Drawing Sheets

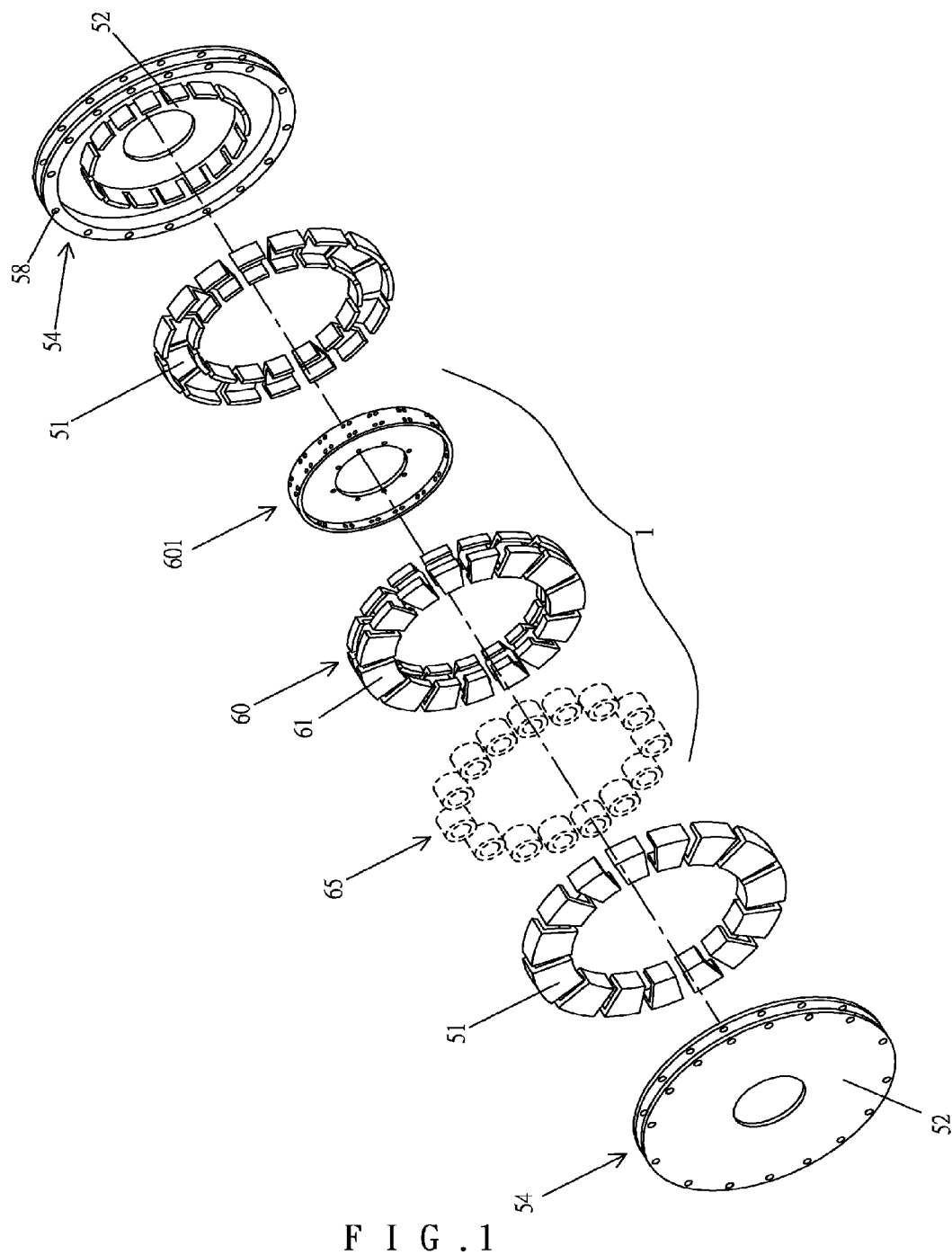
F I G . 1

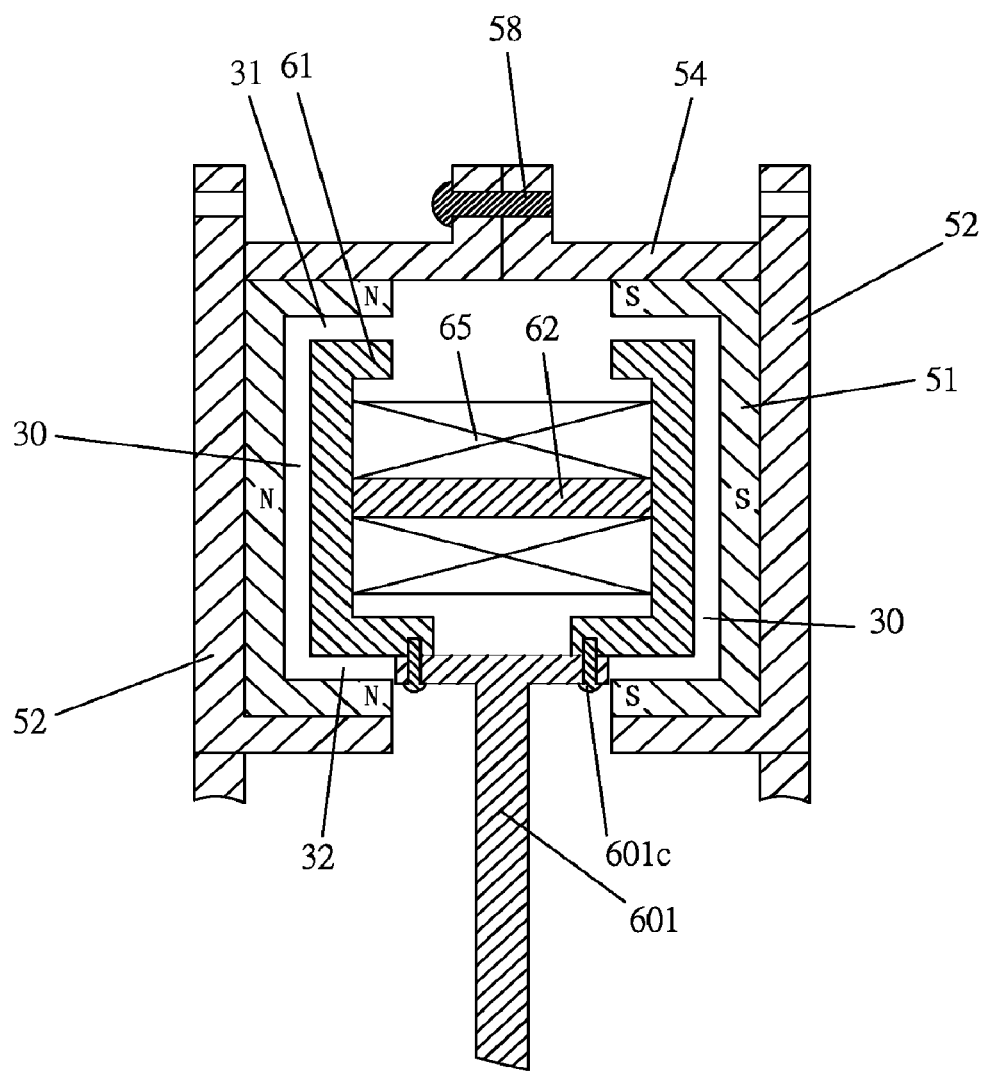
F I G . 4

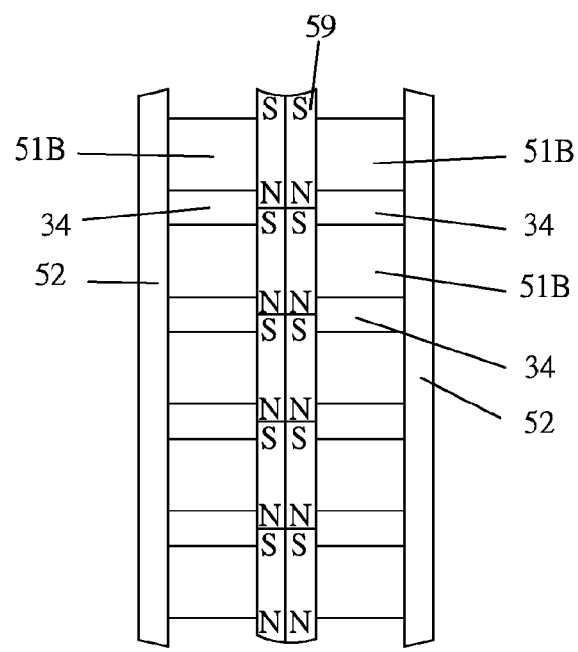
F I G . 10A
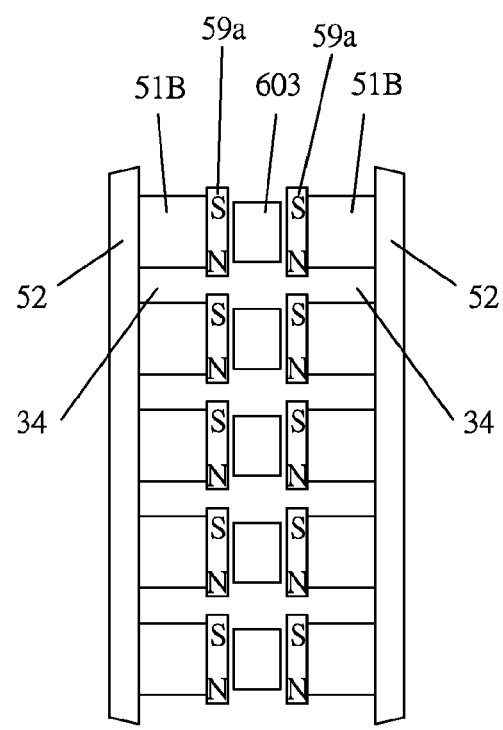
F I G . 10B

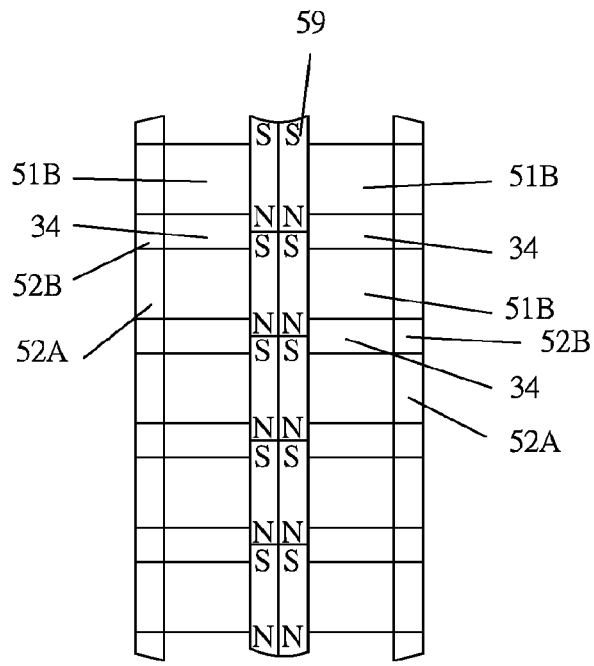
F I G . 11A
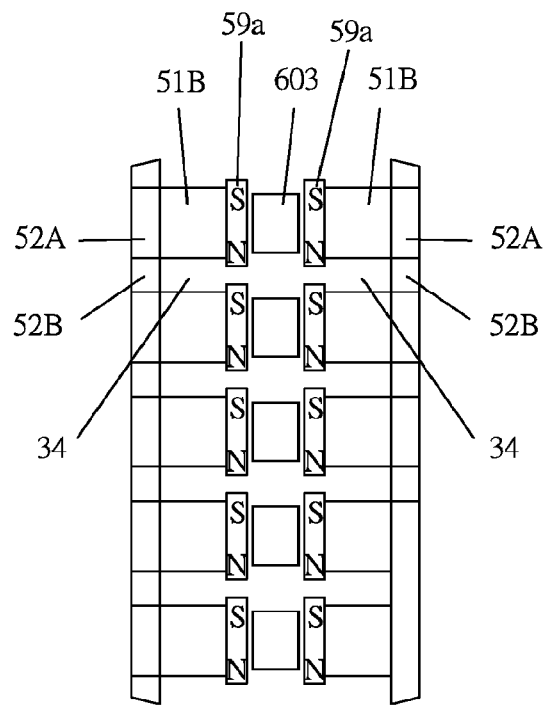
F I G . 11B

MAGNETIC FORCE ROTATION DEVICE

BACKGROUND OF THE INVENTION

1. Field of the Invention

The present invention relates to a frame of magnetic force rotation devices. More particularly È the present invention relates to magnetic force rotation devices including a stator having a plurality of magnetically isolated stator components for interacting with a plurality of rotor components having permanent magnets, with an axial component air-gap and two radial component air-gaps formed between each pole of the rotor elements and an corresponding pole of the stator members.

2. Description of the Related Art

Most early designs of electric machines utilized an end of a ferromagnetic member to create torque, which merely utilized half potential of electric machines. Current rotary electric machines utilize two ends of a winding to provide a larger effective air-gap surface area between the rotor and the stator for the purposes of creating the torque of the electric machines. However, adjacent magnetic poles adversely affect concentration of flux in the structure of conventional general-purpose electronic machines and result in undesired transformer interference effect.

U.S. Pat. No. 6,791,222 to Maslov et al. discloses a rotary electric machine utilizing two ends of a winding to increase the air-gap surface area between the rotor and the stator. The transformer interference effect resulting from the flux between adjacent windings is eliminated by isolating pole pairs from one another. The stator of such a D.C. electric machine includes a plurality of ferromagnetically isolated electromagnets. The axially aligned rotor magnets and the stator poles provide concentrated flux that can be focused on a relatively large surface to produce high torque. Furthermore, a sensor detects relative position between the rotor and the stator for optimally controlling winding current on the electromagnets at different times, thereby allowing smooth operation of the electric machine.

In U.S. Pat. No. 6,891,306 Maslov et al. improves the structure of the above-mentioned electric machine to obtain larger overall effective air-gap surface area. By increasing the surface areas of the stator poles and the rotor magnets and through improved flux distribution resulting from concentration of flux, larger flux distribution is provided. Thus, the electric machine provides larger continuous flux-producing paths between the rotor elements and stator elements. By increasing the surface area between the rotor poles and the corresponding stator poles extending through a plurality of air-gaps, flux can be focused on a relative larger surface to further increase the torque of the electric machine.

These principles are further improved and gained in the present invention so that the flux can be focused on a relatively larger area and that the flux distribution is more balanced.

SUMMARY OF THE INVENTION

An objective of the present invention is to provide a magnetic force rotation device with high efficiency and high output while lowering torque pulsation and providing save, flexible operating characteristics during operation of the electric machine.

To attain the above objective, the present invention provides a magnetic force rotation device having better geometrical, spatial balance through additional radial correspondence between the stator poles and the corresponding rotor poles. Furthermore, the surface area of the rotor poles and the corresponding stator poles extending through the air-gaps is increased to further increase the torque capacity of the magnetic force rotation device. Safe, flexible operating characteristics are further improved in addition to attaining high-efficiency, high-torque output of the magnetic force rotation device. The above demands can be attained by at least a portion of the structure of the magnetic force rotation device in accordance with the present invention.

A first embodiment of the present invention includes a magnetic force rotation device having a stator and a rotor. The rotor includes a plurality of magnetic elements each having permanent magnets. Each magnetic element includes two magnetic poles with opposite magnetic polarities. The plurality of magnetic elements successively alternate in polarities (N/S) along a circumferential direction about a revolving shaft to form a wheel-shaped ring, with adjacent permanent magnets arranged along the circumferential direction about the revolving shaft being spaced by a gap from each other. Furthermore, each magnetic element with permanent magnets includes a substantially C-shaped coupling seat made of ferromagnetic material. The inner surface of each C-shaped coupling seat is coupled with a rear surface of two U-shaped permanent magnets to form two U-shaped magnetic poles spaced from each other by an axial component air-gap. Each U-shaped magnetic pole includes three pole faces having identical magnetic polarity, with one of the three pole faces generally being perpendicular to the rotational face and facing the axial component air-gap, and with the other two pole faces facing the respective radial component air-gaps. The stator includes a plurality of magnetically isolated electromagnetic members that are arranged along the circumferential direction of the revolving shaft to form a wheel-shaped ring. Each electromagnetic member includes twin poles connected by a ferromagnetic core segment. Each pole of the twin poles includes a substantially U-shaped cross section. A bottom pole face of three pole faces of an outer side of the U-shaped cross section is generally perpendicular to the revolving shaft, and the other two pole faces face the respective radial component air-gaps. A winding is formed on the core segment of the electromagnetic member. Each electromagnetic member of the stator is fixed by a support structure made of ferromagnetic material to the stator such that the electromagnetic members of the stator have no ferromagnetic contact therebetween. The stator and the rotor are assembled, with the stator wheel-shaped ring being at least partly surrounded by the rotor wheel-shaped ring to define two axial component air-gaps between the rotor and the stator on two sides of the rotor perpendicular to the revolving shaft such that two axial component air-gaps are located on opposite axial sides of the stator. Each pole of the twin poles of the electromagnetic members of the stator corresponds to one magnetic pole of two magnetic poles of the magnetic elements of the rotor. Thus, one of the above two axial component air-gaps and two radial component air-gaps are provided between one of the twin poles of the electromagnetic members of the stator and one corresponding magnetic pole of the two magnetic poles of the magnetic elements of the rotor.

The winding of each electromagnetic member of the stator has an independent switch for energization. When a winding is energized, the pole faces of the twin poles of the electromagnetic member produce opposite magnetic polarities, and the magnetic polarities of three pole faces of each pole are the same. The polarities of the twin poles of the electromagnetic member are reversed when the current in the winding is reversed. Energization of the winding on each electromagnetic member is decided according to the relative position between the stator and the rotor to control the magnetic polar orientation and the magnitude of the pole faces of the twin poles of the electromagnetic member at proper time. The respectively energized twin poles of the electromagnetic members of the stator are spaced by air-gaps from the surrounding rotor permanent magnets and produce an appropriate attractive or repulsive force through reaction with the magnetic poles of the permanent magnetic fields of the corresponding magnetic elements of the rotor for driving the rotor.

In the first embodiment, the surface area of the rotor magnetic pole and the corresponding stator pole extending across the air-gaps is increased by increasing the pole face of the rotor magnetic pole facing the radial component air-gap and the pole face of the corresponding stator pole, allowing flux to be focused on a relatively larger surface to further increase the torque capacity of the magnetic force rotation device. Meanwhile, additional structural advantages are provided through an increase in the pole face on the magnetic force rotation device facing the radial component air-gap. The spatial, geometrical balance of the magnetic force rotation device is enhanced to further improve safe, flexible operational characteristics.

In a second embodiment of the present invention, each U-shaped permanent magnet of each magnetic pole of the magnetic element of the rotor is replaced with three permanent magnets. Each of two magnetic poles with opposite magnetic polarities of each magnetic element has three pole faces with identical magnetic field polarities. Such an arrangement allows easier preparation of permanent magnets and operation of the magnetic force rotation device is the same, although adverse affect to concentration of torque-producing flux occurs.

In a third embodiment of the present invention, the fixing pattern between the electromagnetic members of the stator and the stator is improved. Two lateral sides of each U-shaped pole of the electromagnetic member of the stator of the magnetic force rotation device facing the radial component air-gaps are modified to be more symmetric such that the adverse effect resulting from geometrical imbalance can be further reduced when the twin poles of the electromagnetic member faces the permanent magnetic poles of the magnetic element of the rotor across the axial component air-gaps and the radial component air-gaps. Furthermore, such a structure provides a relatively larger air-gap surface area such that the flux can be focused on a larger surface to further increase the torque capacity. To improve the flux distribution of two magnetic poles of the magnetic element, the rotor includes additional permanent dipole magnets in the axial gaps between two magnetic faces of the electric element facing the radial component air-gaps. The additional permanent magnets are mounted on the axial ends of the pole faces of two adjacent U-shaped permanent magnets of each magnetic element that face the radial component air-gaps. The additional permanent magnets have a magnetic polar orientation generally in the circumferential direction about the revolving shaft, wherein the magnetic polar orientation directs toward the same circumferential direction. The thickness size of the additional permanent magnets may be the same as those of the U-shaped permanent magnets driving the magnetic force rotation device.

In a fourth embodiment of the present invention with a further improvement, besides the additional permanent magnets added to the rotor of the magnetic force rotation device, adjacent permanent magnets of the rotor along the circumferential direction about the revolving shaft are spaced by a gap and have no ferromagnetic contact therebetween. Thus, the flux distribution can be smoother to attain maximum utility of flux. By such an arrangement and due to geometrical improvement to the structure of the magnetic force rotation device, adverse affect resulting from geometrical imbalance can be minimized. The flux distribution can be smoother and the flux can be more focused to attain a high-efficient, high-output magnetic force rotation device with safe, flexible operational characteristics without increasing space and weight.

Additional advantages of the present invention will become readily apparent to those skilled in the art from the following detailed description and embodying illustration and through thorough consideration of the explanation of the present invention. In practice, the present invention is capable of other and different embodiments, and its several details are capable of modifications in various obvious respects, all without departing from the present invention. Accordingly, the drawings and description are to be regarded as illustrative in nature, and not as restrictive.

INDUSTRIAL APPLICATION

The magnetic force rotation device in accordance with the present invention is suitable for a highly efficient generator or motor and can be utilized as an engine for driving devices such as electric wheel chairs, electric motorcycles, electric automobiles, etc.

The embodiments of the invention will be described by way of examples in a non-limiting manner with reference to with the accompanying drawings.

BRIEF DESCRIPTION OF THE DRAWINGS

FIG. 1 is an exploded perspective view of a first embodiment of a magnetic force rotation device in accordance with the present invention.

FIG. 4 is a cross section of the magnetic force rotation device taken along line A-A of FIG. 2.

FIG. 10A is a schematic view showing a side of the outer surface of the U-shaped permanent magnet of the rotor of the magnetic force rotation device of FIG. 8 flattened along the circumferential direction.

FIG. 10B is a schematic view showing a side of the inner surface of the U-shaped permanent magnet of the rotor of the magnetic force rotation device of FIG. 8 flattened along the circumferential direction.

FIG. 11A is a schematic view of a fourth embodiment of the present invention illustrating a variation of the side of the inner surface of the U-shaped permanent magnet of the rotor of the magnetic force rotation device of FIG. 10A flattened along the circumferential direction.

FIG. 11B is a schematic view of the fourth embodiment of the present invention illustrating a variation of the side of the outer surface of the U-shaped permanent magnet of the rotor of the magnetic force rotation device of FIG. 10B flattened along the circumferential direction, illustrating a fourth embodiment of the present invention.

DETAILED DESCRIPTION OF THE PREFERRED EMBODIMENTS

Figure 2:
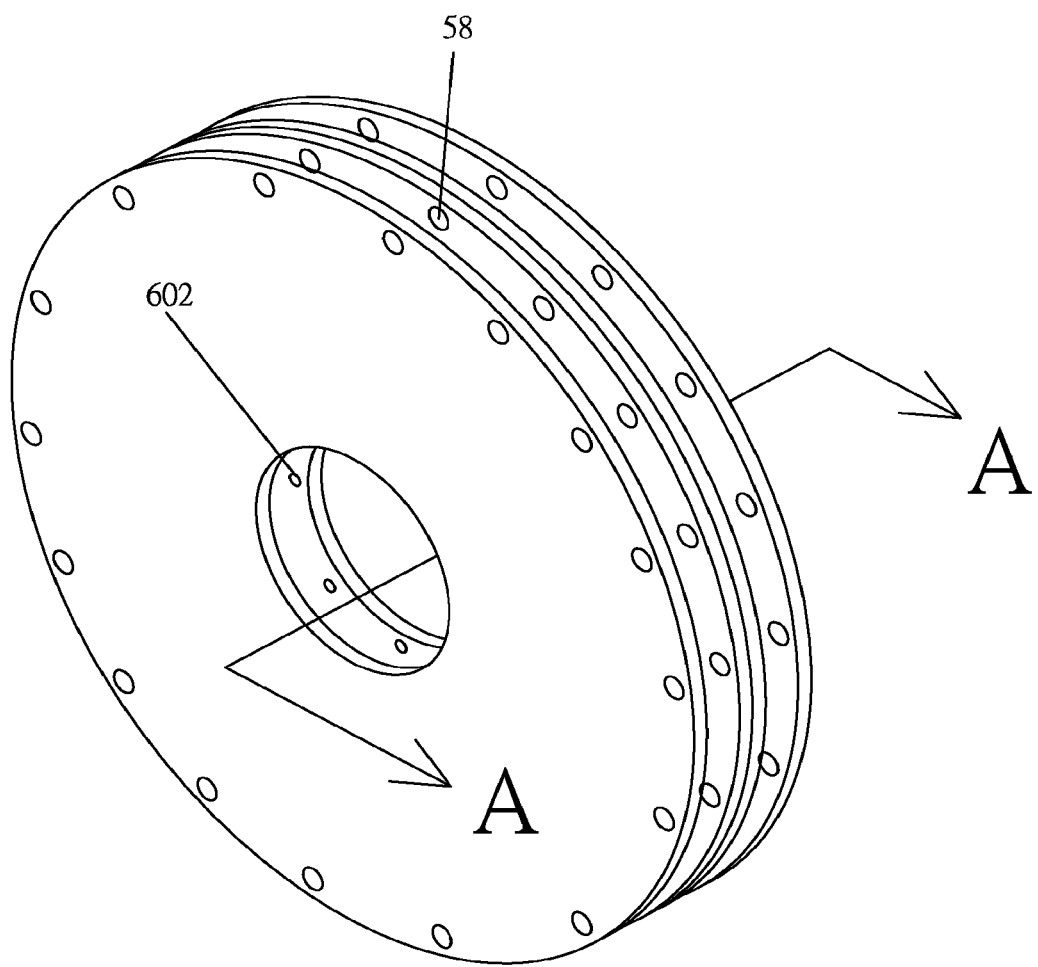
FIG. 2 is a perspective view of the first embodiment of the magnetic force rotation device in accordance with the present invention after assembly.

FIG. 1 is an exploded perspective view illustrating members of a first embodiment of a magnetic force rotation device in accordance with the present invention. The magnetic force rotation device includes a stator and a rotor. A plurality of electromagnetic members 60 are arranged along a circumferential direction about a revolving shaft to form a stator wheel-shaped ring after assembling the components included in the bracket. Each electromagnetic member of the stator wheel-shaped ring includes twin poles connected by a ferromagnetic core segment on which a winding 65 is formed. Each of the twin poles 61 of the electromagnetic member is substantially U-shaped in cross section, wherein a bottom one of three pole faces on the outer side of the U-shaped cross section is generally perpendicular to the revolving shaft whereas the remaining two pole faces of the U-shaped cross section face respective radial component air-gaps. A stator support ring 601 made of non-ferromagnetic material serves as a fixing frame for the respective electromagnetic members to fix the electromagnetic members to a stator shaft. On the rotor, two U-shaped permanent magnets 51, two side portions 52, and two half cross-sectional wall portions 54 are assembled together via engaging holes 58 in flanges on the cross-sectional wall portions. A plurality of magnetic elements having permanent magnets are arranged along the circumferential direction about the revolving shaft and successively alternate in magnetic polarities (N/S) to form a rotor wheel-shaped ring, with two adjacent permanent magnets along the circumferential direction about the revolving shaft being spaced by a gap. The stator wheel-shaped ring is at least partly surrounded by the rotor wheel-shaped ring. Thus, two axial component air-gaps are defined between the rotor and the stator on two sides of the rotor perpendicular to the revolving shaft. Meanwhile, two radial component air-gaps are defined between the rotor and the stator on two radial sides of each magnetic pole of each magnetic element of the rotor.

FIG. 2 is a perspective view of the first embodiment of the magnetic force rotation device in accordance with the present invention after assembly through the engaging holes 58 in the flanges on the cross-sectional wall portions of the rotor. The rotor can be coupled with the stator shaft via bearings. Fixing holes 602 in the stator support ring allows the stator to be coupled with the stator shaft. The magnetic force rotation device is suitable for driving a device using wheels as transport means.

Figure 3:
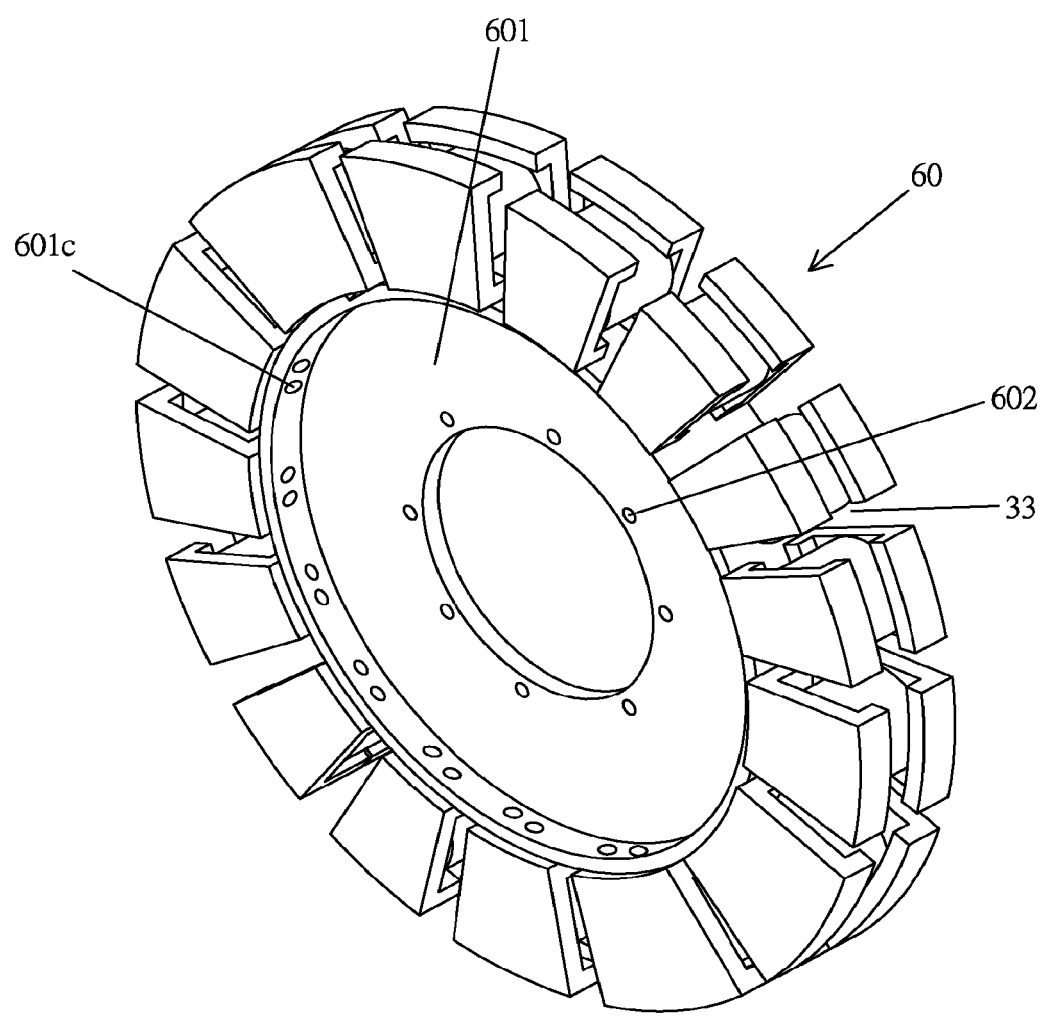
FIG. 3 is a perspective view of a stator of the first embodiment of the magnetic force rotation device in accordance with the present invention after assembly.

A stator wheel-shaped ring of a stator portion of magnetic force rotation device according to the first embodiment of the present invention is illustrated in FIG. 3. The plurality of electromagnetic members 60 are fixed via holes 601c in the stator support ring 601 by conventional means in the stator support ring 601 made of non-ferromagnetic material. Two adjacent electromagnetic members of the stator wheel-shaped ring are spaced by a gap 33 to magnetically isolate adjacent electromagnetic members so that the electromagnetic members have no ferromagnetic contact therebetween. The structure of FIG. 3 allows the torque-producing flux to be focused while providing a large air-gap surface area such that the volume of the structure of the magnetic force rotation device can be further reduced with the same output, attaining a magnetic force rotation device with a higher efficiency. The gaps 33 between adjacent electromagnetic members may not be identical to one another to allow easy coordination with the elements on the rotor. The torque pulsation of the magnetic force rotation device can be reduced to attain smooth operations through appropriate arrangement. The fixing holes 602 in the stator support ring are preserved for coupling with the stator shaft.

FIG. 4 is a cross section of the magnetic force rotation device taken along line A-A of FIG. 2. In the embodiment of the present invention, for ease of explanation but not for restriction, the substantially C-shaped coupling seat of the magnetic element of the rotor is separated into two halves. In FIG. 4, each half of the C-shaped coupling seat of the magnetic element of the rotor includes an L-shaped side portion 52 and a half cross-sectional wall portion 54. The flange on each half cross-sectional wall portion 54 and the holes 58 in the flange serve for fixing two halves of the rotor ring to form a complete C-shaped coupling seat. For the two halves of the C-shaped coupling seat of each magnetic element, a rear surface of a substantially U-shaped permanent magnet 51 is coupled with the inner surface of a half of the C-shaped coupling seat of the magnetic element whereas another U-shaped permanent magnet 51 with an opposite polarity is coupled with the inner surface of the other half of the C-shaped coupling seat. Thus, each substantially C-shaped magnetic element includes two magnetic poles with opposite magnetic polarities on the magnetic pole faces thereof. The permanent magnet on each magnetic pole face of the magnetic element is a thin permanent dipole magnet having a substantially U-shaped pole face. The U-shaped pole face of each permanent magnet exhibits a single magnetic polarity opposite to that of a U-shaped rear surface of the permanent magnet mounted to the inner surface of the C-shaped coupling seat. In the rotor, adjacent permanent magnets arranged along the circumferential direction about the revolving shaft successively alternate in magnetic polarities (N/S). The magnetic polarities N and S shown in the figure only serve for illustration of the magnetic polarities of the magnetic field created by the magnetic pole faces facing the air-gaps, not for restrictive purposes. A bottom pole face of the inner side of the U-shaped permanent magnetic pole of each half of each magnetic element faces respectively a individual axial component air-gap 30 whereas the two lateral pole faces of the inner side of the U-shaped permanent magnetic pole face the respective radial component air-gaps 31 and 32 such that each U-shaped magnetic pole face of the two magnetic poles of the magnetic element reacts with the pole face of a corresponding pole of the twin poles of the electromagnetic member of the stator across the air-gaps that they face respectively. To the two U-shaped permanent magnets mounted on the C-shaped coupling seat of the magnetic element, the C-shaped coupling seat of the magnetic element made of ferromagnetic material serves as a flux return path of the two U-shaped permanent magnetic poles of the magnetic element so that the flux focuses on the ends of the two U-shaped permanent magnetic poles of the magnetic element.

Each electromagnetic member of the stator includes twin poles connected by a core segment 62 made of ferromagnetic material. Each pole of the twin poles 61 includes a substantially asymmetric U-shaped cross section having a U-shaped outer surface with three pole faces. Two lateral ones of the three pole faces of the U-shaped cross section of each pole respectively face the radial component air-gaps 31 and 32, and a bottom one of the three pole faces of the U-shaped cross section faces one of the axial component air-gaps 30. A U-shaped pole of a pole air is connected with another U-shaped pole via the core segment 62, and a winding 65 is formed on the core segment 62 of the electromagnetic member to form an electromagnetic member example illustrated in FIG. 4. The U-shaped pole face of each pole 61 substantially reacts with the corresponding pole face of the corresponding U-shaped permanent magnet of the rotor across the radial component air-gaps 31 and 32 and the axial component air-gaps 30 therebetween. Thus, in the magnetic force rotation device, each pole of the twin poles of the electromagnetic members and the corresponding pole of the two magnetic poles of the corresponding magnetic element are spaced from each other by an axial component air-gap and two radial component air-gaps. The holes 601c in the stator support ring are respectively coupled to the electromagnetic members by conventional means, as shown in FIG. 4. The rotor surrounding the stator is coupled by an appropriate frame to the stator shaft via bearings. The core segment 62 and the twin poles 61 of the electromagnetic member can be made of ferromagnetic material such as Fe, SiFe, SiFeP, SiFeCo, etc. Each electromagnetic member of the stator is coupled by the ring 601 made of non-ferromagnetic material to form a stator wheel-shaped ring, with the electromagnetic members of the stator having no ferromagnetic contact therebetween. The non-ferromagnetic material may be aluminum or other non-ferromagnetic materials. In practical operation, each electromagnetic member of the stator of the magnetic force rotation device forms an independent flux. Ferromagnetic isolation between the electromagnetic members reduces stray flux loss and fringing effect.

The winding 65 of each electromagnetic member of the stator has an independent switch for energization. When a winding is energized, the pole faces of the twin poles of the electromagnetic member produce opposite magnetic polarities N and S. The magnetic polarities N and S of the twin poles of the electromagnetic member are reversed when the current in the winding is reversed. The respectively energized twin poles of the electromagnetic members of the stator and the surrounding rotor permanent magnetic poles are spaced by the radial component air-gaps 31 and 32 and the axial component air-gaps 30 faced by the twin poles. On/off of energizing of the winding can be controlled by a mechanical commutator or an electronic switching circuit. Control of the electronic switching circuit requires detection signal from a sensor. In operation, each electromagnetic member of the stator can be deemed as an independent member that responses based on the relative location between the stator and the rotor detected by the sensor to properly decide the energization control of its winding. Thus, energization of the winding of each electromagnetic member can be decided according to the relative location between the stator of the rotor. When energization of the winding of the electromagnetic member causes magnetization of the electromagnetic member, the flux resulting from the energization of the winding passes across the air-gaps to produce magnetomotive force that interacts with the corresponding permanent magnets of the corresponding magnetic element of the rotor to produce appropriate attraction or repulsion, thereby providing required rotation. Adverse affect of magnetic field interference effect between two adjacent windings is handled by mutual separation between the flux paths of the electromagnetic members of the stator.

Figure 5:
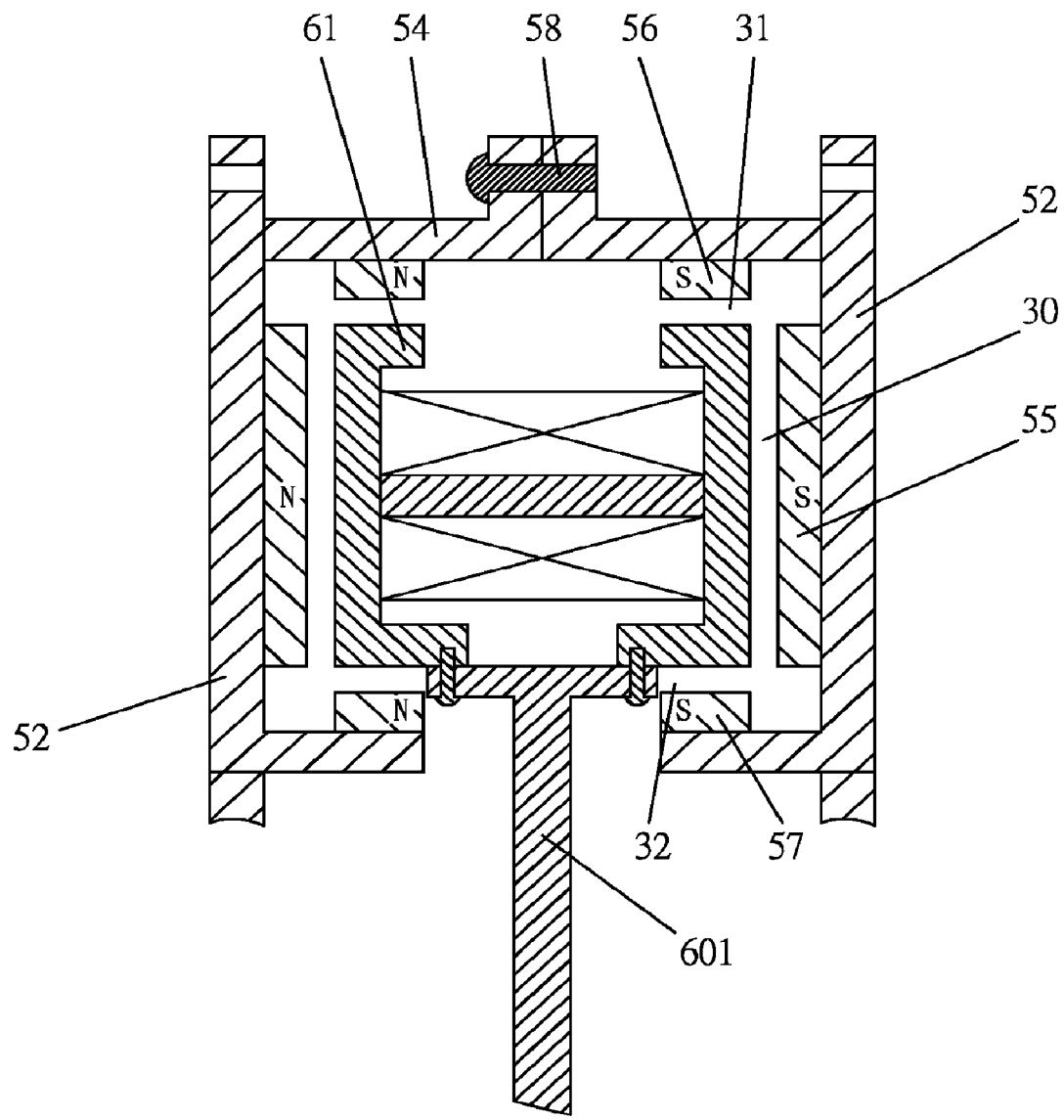
FIG. 5 is a variation of a cross section of FIG. 4, illustrating a second embodiment of the present invention.

FIG. 5 is a variation of a cross section of FIG. 4, illustrating a second embodiment of the present invention. In the illustrative figures of the present invention, wherein only the elements modified are labeled with different reference numbers to allow easy understanding of the modifications among the embodiments. The second embodiment allows easy preparation of the permanent magnets in which the frame of the magnetic force rotation device in FIG. 4 is modified. The two U-shaped permanent magnets 51 and 52 on the inner surface of the C-shaped coupling seat of the magnetic element of FIG. 4 are replaced by three permanent magnets 55, 56, and 57 of FIG. 5. In FIG. 5, the permanent magnet 55 is mounted on a face of the inner surface of the C-shaped coupling seat that is perpendicular to the revolving shaft such that the magnetic pole face faces one of the radial component air-gaps 30. The permanent magnets 56 and 57 are mounted on the faces of the inner surface of the C-shaped coupling seat that face the radial component air-gaps such that the magnetic pole faces respectively face the radial component air-gaps 31 and 32. Each of the three permanent magnets on each magnetic pole is a thin permanent dipole magnet having a flat pole face. Each permanent magnetic pole face only exhibits a single magnetic polarity opposite to that on the rear surface of the permanent magnet. Thus, three adjacent permanent magnet pole faces of each of the two halves on the inner side of the C-shaped coupling seat of a magnetic element have identical magnetic field polarity (such that the fluxes extending across the air-gaps assist each other) opposite to that of three adjacent permanent magnets of the other half of the same magnetic element. The magnetic polarities N and S in FIG. 5 are for illustrating the polarity of the magnetic field of the permanent magnetic pole, not for restrictive purposes.

Figure 6:
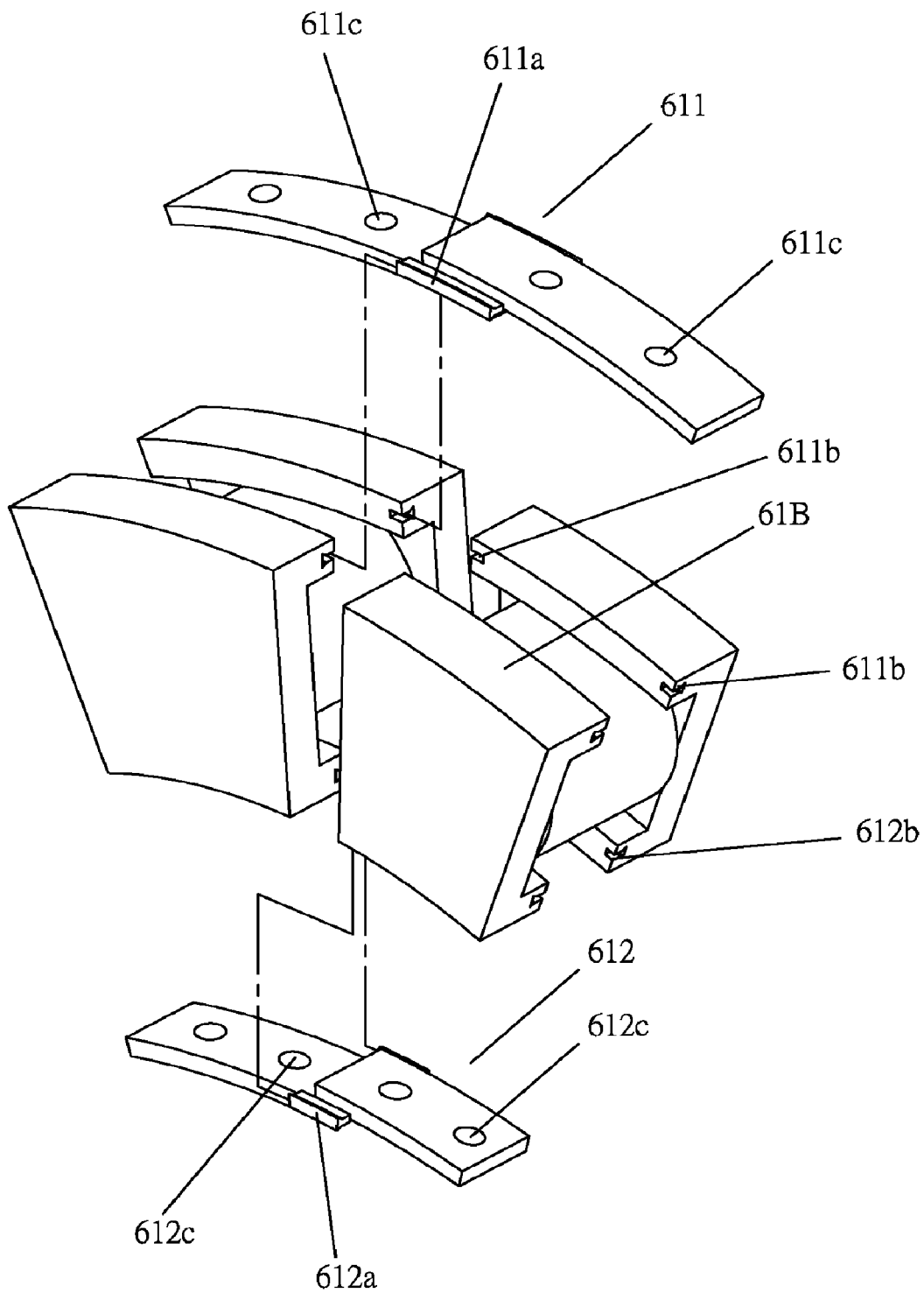
FIG. 6 is a variation of partial, exploded perspective view similar to a portion of the stator of the magnetic force rotation device of FIG. 3, illustrating a third embodiment of the present invention.
Figure 7:
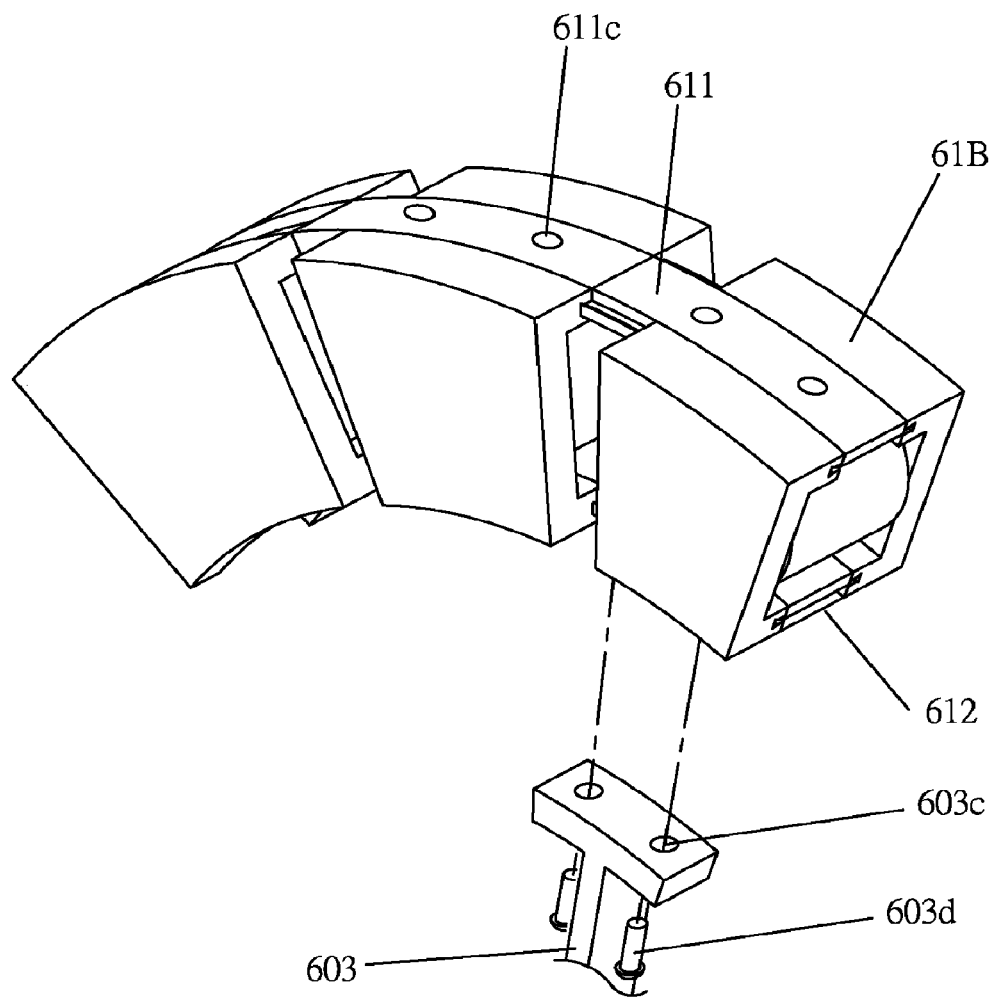
FIG. 7 is a perspective view illustrating the exploded portion of the stator of the magnetic force rotation device of FIG. 6 after assembly.

In a third embodiment of the present invention the fixing pattern of the electromagnetic members of the first embodiment of the magnetic force rotation device is changed, wherein this better embodiment is illustrated in FIGS. 6, 7, 8, 9, 10A, and 10B. FIG. 6 is a variation of partial, exploded perspective view similar to a portion of the stator of the magnetic force rotation device of FIG. 3. In FIG. 6, each pole 61B of a substantially U-shaped structure of the twin poles of the electromagnetic member of the stator is more symmetric on two lateral sides thereof facing the radial direction so that adverse affect resulting from geometrical imbalance can be reduced when the twin poles of the electromagnetic member reacts with the corresponding permanent magnetic pole of the magnetic element of the rotor across the air-gaps. Each U-shaped pole 61B of the electromagnetic member of the stator includes a notch 611b, 612b in each of four corners thereof, as illustrated in FIG. 4. Each balancing/fixing plate 611, 612 made of non-ferromagnetic material includes a protrusion 611a, 612a formed on each of two opposite axial lateral sides and having a varying width, with the outer portion being wider, and with the inner portion being narrower for coupling with the body of the balancing/fixing plate 611, 612. The body of each balancing/fixing plate 611, 612 may be comprised of two parts, specifically inner and outer parts having an elongated cross section and having their ends coupled in the radial direction, with a width-varying protrusion 611a, 612a protruding outward from each of two opposite axial lateral sides of the coupling section. The two radially coupled elongated parts are substantially adjoining arcs of a different radius, allowing an outer one of the elongated parts to intimately adjoin the inner one of the elongated parts. Two adjoining balancing/fixing plates can be fixed together via holes 611c, 612c so that a plurality of balancing/fixing plates adjoin one another to form a circular ring with two different radii. The protrusions 611a and 612a on the balancing/fixing plates and the notches 611*b* and 612*b* of the U-shaped pole of the electromagnetic member of the stator include respective radii with respect to the stator shaft such that the notches 611*b* and 612*b* respectively and tightly engage with the protrusions 611*a* and 612*a*. By tight engagement between the notches of each U-shaped pole of the electromagnetic members and the protrusions of the balancing/fixing plates, a plurality of magnetically isolated electromagnetic members surround the stator shaft to form a stator wheel-shaped ring. FIG. 7 is a perspective view illustrating the exploded portion of the stator of the magnetic force rotation device of FIG. 6 after assembly. In FIG. 7, a stator support rod 603 serves for fixing the stator wheel-shaped ring to the stator shaft. Holes 603*c* in the stator support rod 603 can be coupled by conventional fixing patterns with holes 612*c* in the balancing/fixing plate via fasteners 603*d*. In practice, operation of the magnetic force rotation device is the same even without the balancing/fixing plates 611. By better spatial, geometrical balance of the magnetic elements of the rotor and the electromagnetic members of the stator, adverse affect to the electric machine resulting from energization of the winding of a single electromagnetic member is reduced as much as possible to provide more delicate output control of the electric machine and, thus, attain safe, flexible operational characteristics.

Figure 8:
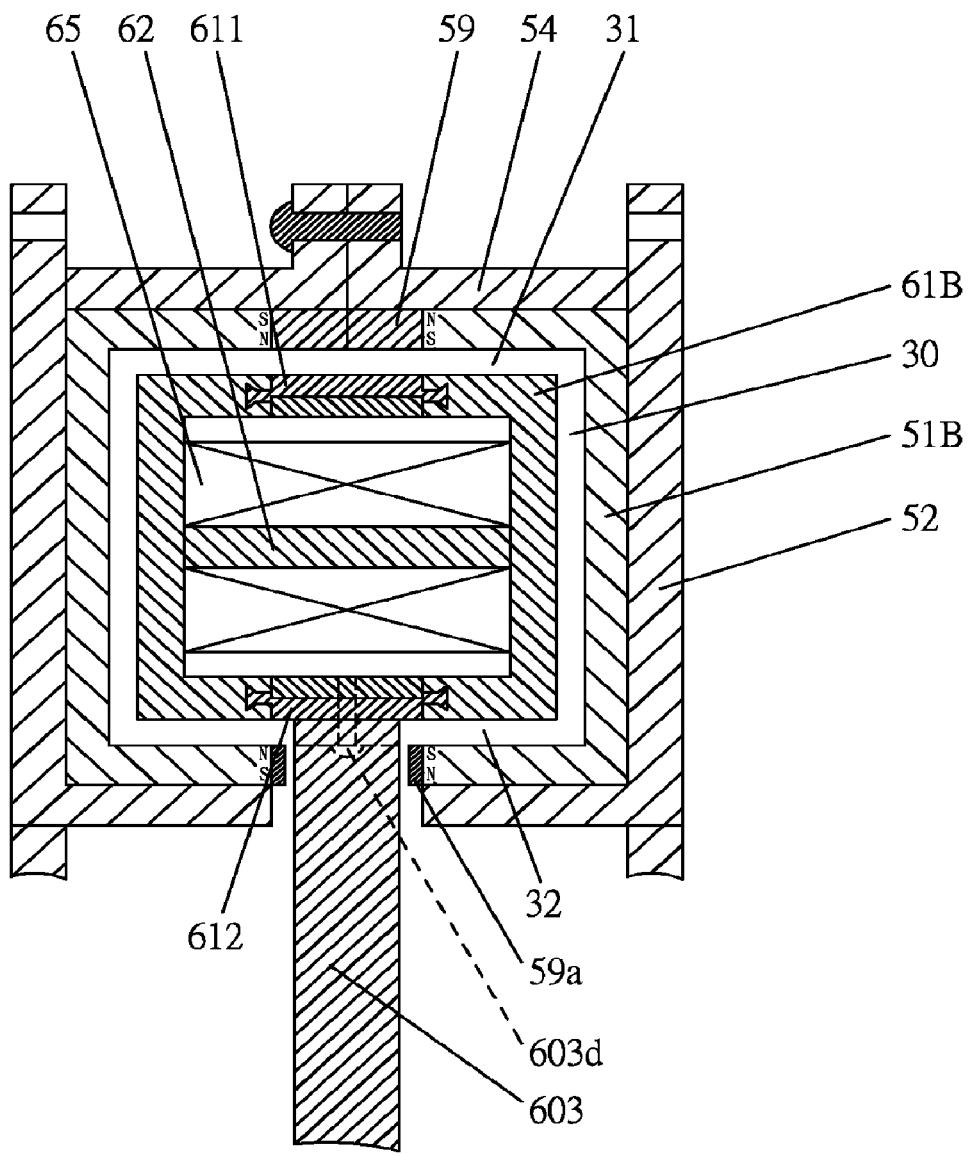
FIG. 8 is a cross section illustrating a portion of the third embodiment of the magnetic force rotation device in accordance with the present invention, with a portion of the stator of the magnetic force rotation device after assembly being shown in FIG. 7.

FIG. 8 is a cross section illustrating a portion of the third embodiment of the magnetic force rotation device in accordance with the present invention, with a portion of the stator of the magnetic force rotation device after assembly being shown in FIG. 7. The frame of FIG. 8 improves the spatial distribution of the flux while providing a large air-gap surface area. Each substantially U-shaped pole 61 of FIG. 4 is replaced by a substantially U-shaped pole 61B that is more symmetric, in which the fixing pattern of the electromagnetic members of the stator is modified to obtain a more symmetric structure. Besides allowing coupling of two adjoining balancing/fixing plates, the holes of the balancing/fixing plates 612 can be coupled with the holes of the stator support rod 603. To match the change of the electromagnetic members of the stator, each U-shaped permanent magnet 51 of the rotor of FIG. 4 is replaced by a U-shaped permanent magnet 51B with a larger air-gap surface area. Compared to the U-shaped permanent magnet 51 of FIG. 4, two pole faces of the U-shaped permanent magnet 51B facing the radial component air-gaps 31 and 32 extend axially such that the two pole faces react with the corresponding pole faces of the U-shaped pole 61B of the electromagnetic member of the stator across the radial component air-gaps 31 and 32. Two additional elongated, dipole extended permanent magnets 59 and 59*a* are respectively mounted on two lateral sides of the U-shaped permanent magnet 51B and extend axially. Each additional extended permanent magnet 59, 59*a* has a magnetic polar orientation in the circumferential direction about the revolving shaft. The winding 65, the core segment 62, and the cross-sectional wall portion of the magnetic element are also shown in FIGS. 8 and 9 for illustrative assistance.

Figure 9:
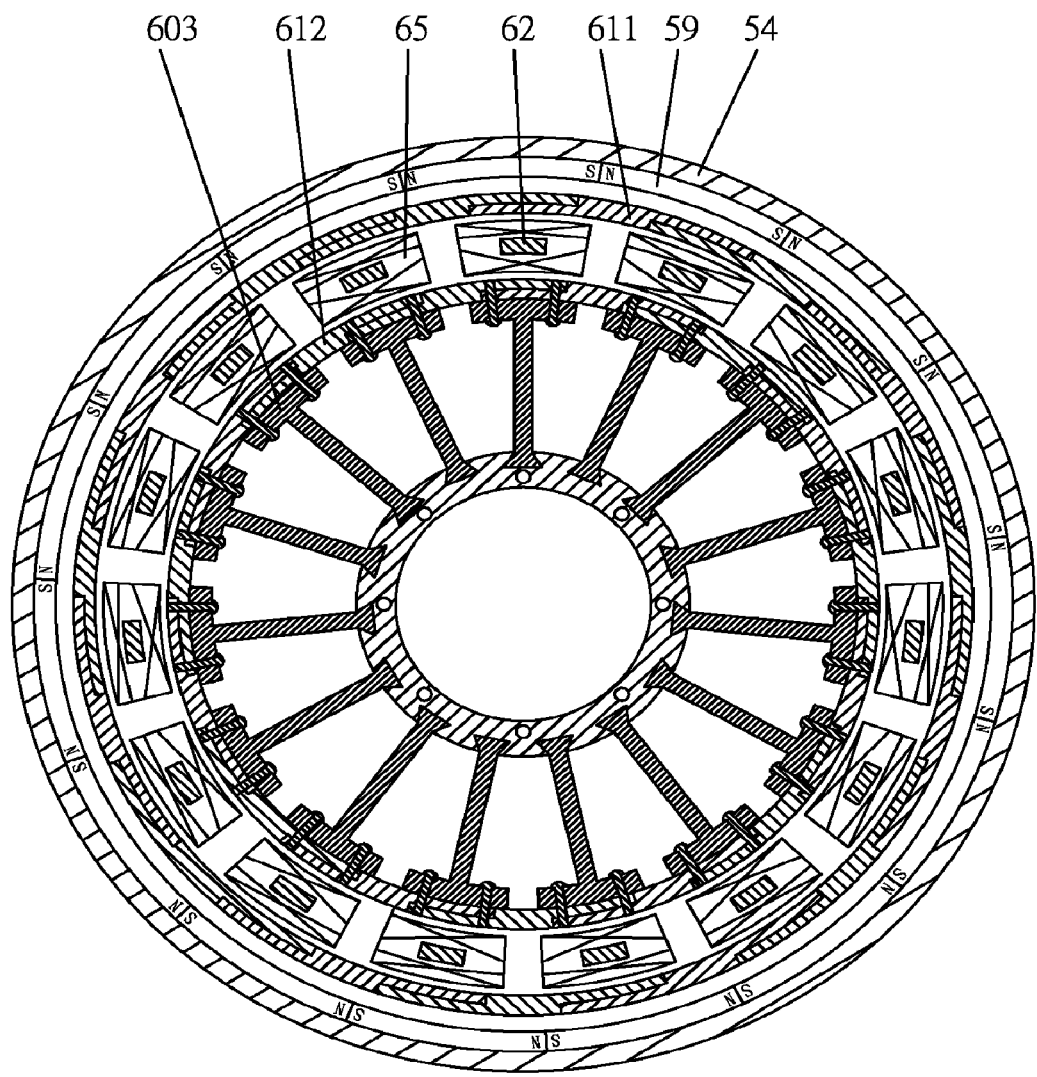
FIG. 9 is a cross section of the magnetic force rotation device of FIG. 8 after assembly of the rotor and the stator.

The magnetic polar orientation of the additional extended permanent magnets 59 is illustrated in FIGS. 9 and 10A whereas the magnetic polar orientation of the additional extended permanent magnets 59 is illustrated in FIG. 10B. FIG. 9 is a cross section of the magnetic force rotation device of FIG. 8 after assembly of the rotor and the stator. FIG. 9 illustrates an example of fixing the stator wheel-shaped ring by the stator support rod 603 as well as a plurality of balancing/fixing plates 611 and 612 that adjoin each other to form respective circular rings. The magnetic polar orientation of the additional extended permanent magnets 59 illustrated in FIGS. 9 and 10A is generally in the circumferential direction about the revolving shaft, in which the magnetic polarities N and S in the figures are for illustration only, not for restriction.

FIG. 10A is a schematic view showing a side of the outer surface of the U-shaped permanent magnet 51B of the rotor of the magnetic force rotation device of FIG. 8 flattened along the circumferential direction. The additional extended permanent magnets 59 extend on the surface of the inner side of the cross-sectional wall portion to separate the axially adjacent permanent magnets of each magnetic element on the cross-sectional wall portion. The magnetic polar orientation of the additional extended permanent magnets 59 is in the circumferential direction about the revolving shaft. The magnetic polar orientation directs toward the same circumferential direction, generally about the revolving shaft. Furthermore, two additional extended permanent magnets 59 adjacent along the circumferential direction about the revolving shaft may have a tiny gap therebetween if the illustrated tight coupling is not required. The L-shaped side portions of the magnetic element of the rotor are shown for illustrative assistance.

FIG. 10B is a schematic view showing a side of the inner surface of the U-shaped permanent magnet 51B of the rotor of the magnetic force rotation device of FIG. 8 flattened along the circumferential direction for assisting in illustration of FIG. 8. The additional extended permanent magnet 59*a* of each U-shaped permanent magnetic pole 51B of the magnetic element is located on the axial end of the lateral side of the inner face facing the radial component air-gap 32. A stator support rod 603 is located between the extended permanent magnets 59*a* on two U-shaped magnetic poles 51B with opposite magnetic polarity of the magnetic element. The magnetic polar orientation of the additional extended permanent magnets 59*a* is generally in the circumferential direction about the revolving shaft. Two adjacent additional extended permanent magnets 59*a* along the circumferential direction about the revolving shaft may have a tiny gap therebetween that barely affects the function of the extended permanent magnets 59. In FIGS. 10A and 10B, the gaps 34 between adjacent permanent magnets 51B of the rotor along the circumferential direction of the revolving shaft may not be identical to coordinate with the components on the stator for attaining required smooth operations.

A fourth embodiment is illustrated in FIG. 11A showing further improvement of the present invention and illustrating a variation with respect to the third embodiment of FIGS. 10A and 10B. FIG. 11A is a schematic view of the fourth embodiment of the present invention illustrating a variation of the side of the inner surface of the U-shaped permanent magnet of the rotor of the magnetic force rotation device of FIG. 10A flattened along the circumferential direction. FIG. 11B is a schematic view of the fourth embodiment of the present invention illustrating a variation of the side of the outer surface of the U-shaped permanent magnet of the rotor of the magnetic force rotation device of FIG. 10B flattened along the circumferential direction. In the third embodiment, adjacent permanent magnets of the rotor along the circumferential direction about the revolving shaft is spaced by a gap 34 from each other whereas the portion of C-shaped coupling seat of the rotor in association with the gap 34 can be made of ferromagnetic material. Nevertheless, in the fourth embodiment, the material of the portion of C-shaped coupling seat of the rotor in association with the gap 34 is replaced with non-ferromagnetic material, as indicated by 52B in FIGS. 11A and 11B, yet the portion of the C-shaped coupling seat in correspondence with the U-shaped permanent magnet 51B is not changed (still made of ferromagnetic material), as indicated by 52A in FIGS. 11A and 11B. Thus, adjacent permanent magnets of the rotor along the circumferential direction of the revolving shaft are spaced from each other without ferromagnetic contact therebetween. In the example shown in FIGS. 11A and 11B, the L-shaped side portions 52A and 52B of the magnetic element of the rotor are shown for illustrative assistance. Such a structure provides smoother flux distribution on the rotor magnetic pole to attain concentration of flux, best utility of flux, and reduction of transformer interference effect of flux, thereby attaining high efficient operation of the magnetic force rotation device under high torque output.

As for the stator or the rotor, the components of any one of them can be manufactured with specific size specifications to simplify production. Thus, the magnetic force rotation device of the present invention provides larger output and higher power and allows easy manufacture.

In all of the afore-mentioned embodiments, the U-shaped pole face of each magnetic pole of the magnetic element of the rotor can be replaced with an arc-shaped pole face, and the coupling seat of the magnetic element is modified according to the arc shape. Furthermore, each of two pole faces of the twin poles of the electromagnetic member of the stator includes a corresponding arc-shaped pole face (not shown) such that the stator and the rotor are still spaced by two axial component air-gaps therebetween and that the stator poles and the corresponding rotor poles have radially aligned radial component air-gaps to separate the stator poles and the rotor poles. By such an arrangement, operation of the magnetic force rotation device is the same, although the pole face surface area is reduced, which arrangement is another embodiment still within the concept of the present invention.

Although specific numbers of the magnetic elements of the rotor and the corresponding electromagnetic members of the stator are mentioned, the numbers of the corresponding electromagnetic members of the stator and the magnetic elements of the rotor and can be identical or not the same to meet the need of designs. Each gap between adjacent magnets of the magnetic elements of the rotor arranged along the circumferential direction about the revolving shaft could be different from each other. Furthermore, each gap used to magnetically isolated from adjacent electromagnetic members of the stator arranged along the circumferential direction about the revolving shaft may not be the same from each other. The torque pulsation during operation of the magnetic force rotation device can be reduced through appropriate arrangement of the gaps. In all of the embodiments above, the coupling seats of the magnetic elements of the rotor can be made of non-ferromagnetic material. Although adverse affect to concentration of flux occurs, operation control of the magnetic force rotation device remains unchanged. Useful operation of magnetic force rotation device can still be attained.

The above embodiments are merely examples of the present invention; however, the present invention is not limited by these embodiments. Although the illustration of the present invention shows a stator surrounded by a rotor, the structure can be arranged in a reverse manner such that the rotor is surrounded by the stator. In this disclosure there are shown and described only preferred embodiments of the present invention and but a few examples of its versatility. It can be appreciated that the present invention is capable of use in various other combinations and environments and is capable of changes or modifications within the scope of the inventive concept as expressed herein.

What is claimed is:

1. A magnetic force rotation device comprising: a rotor including a plurality of magnetic elements containing permanent magnet arranged along a circumferential direction about a revolving shaft to form a rotor wheel-shaped ring, with each said magnetic element having respectively two magnetic poles; and a stator including a plurality of magnetically isolated electromagnetic members coaxially arranged around said revolving shaft to form a stator wheel-shaped ring, each said electromagnetic member having twin poles, wherein said stator wheel-shaped ring at least partly surrounded by said rotor wheel-shaped ring is such that each pole of said twin poles of said electromagnetic members of said stator corresponds to one magnetic pole of said two magnetic poles of said magnetic elements of said rotor respectively, wherein two axial component air-gaps are defined between said stator and said rotor, and wherein one of said poles of said electromagnetic members and said corresponding magnetic pole of said two magnetic poles of said magnetic elements define said an axial component air-gap and two radial component air-gaps therebetween.

2. The magnetic force rotation device of claim 1, wherein said twin poles of each said electromagnetic member of said stator is connected by a ferromagnetic core segment, with a winding formed on said core segment, with said winding, when energized with current, creating opposite magnetic polarities on respective pole faces of said twin poles of each said electromagnetic member of said stator, with said pole faces of each said pole having the same magnetic polarity, and with the magnetic polarities of said pole faces of said twin poles being reversed when the current passes the winding in a reverse direction.

3. The magnetic force rotation device of claim 2, wherein the stator has a non-ferromagnetic support structure, and wherein each said electromagnetic member of said stator is fixed independently by said non-ferromagnetic support structure to said stator such that said electromagnetic members of said stator have no ferromagnetic contact therebetween.

4. The magnetic force rotation device of claim 2, wherein the air-gap in the pole face direction of one pole of said twin poles of each said electromagnetic member has three components, with one of three components of said air-gap being said axial component air-gap, and with the other two components being said radial component air-gaps that are radially aligned with each other.

5. The magnetic force rotation device of claim 4, wherein each of said twin poles of each said electromagnetic member of said stator has a substantially U-shaped cross section having said three component air-gaps, with a bottom pole face of three pole faces of said U-shaped cross section facing said axial component air-gap, and with the other two pole faces respectively facing said radial component air-gaps.

6. The magnetic force rotation device of claim 2, wherein the pole face of each of said two magnetic poles of each said magnetic element of said rotor exhibits a single magnetic polarity opposite to that of the other pole face of said two magnetic poles.

7. The magnetic force rotation device of claim 6, wherein each said magnetic element includes a coupling seat made of ferromagnetic material, with the plurality of permanent magnets mounted to an inner surface of each said magnetic element to form said two magnetic poles of said magnetic element, and with a surface of each said permanent magnet facing said air-gap exhibiting a single magnetic polarity opposite to that of a rear surface of said permanent magnet mounted to said inner surface of said coupling seat of said magnetic element.

8. The magnetic force rotation device of claim 7, wherein the air-gap in the pole face direction of a said permanent magnetic pole of said two magnetic poles of said magnetic elements of said rotor has three components, with one of three components of said air-gap being said axial component air-gap, and with the other two components being said radial component air-gaps that are radically aligned with each other.

9. The magnetic force rotation device of claim 8, wherein each of said magnetic poles of said magnetic elements has a substantially U-shaped cross section to form the three pole faces of said magnetic pole, with a bottom pole face of said three pole faces of each said U-shaped magnetic pole being generally perpendicular to the revolving shaft.

10. The magnetic force rotation device of claim 2, wherein the plurality of permanent magnets of said rotor arranged along the circumferential direction about the revolving shaft successively alternate in magnetic polarities (N/S) along the circumferential direction about the revolving shaft.

11. The magnetic force rotation device of claim 6, wherein said permanent magnets on said two magnetic poles of each said magnetic element are substantially separated by axial gaps from each other.

12. The magnetic force rotation device of claim 10, wherein adjacent said permanent magnets arranged along the circumferential direction about the revolving shaft are spaced by one of the gaps from each other.

13. The magnetic force rotation device of claim 12, wherein adjacent said permanent magnets along the circumferential direction about the revolving shaft are spaced by one of the gaps and have no ferromagnetic contact from each other.

14. The magnetic force rotation device of claim 7, wherein said coupling seat of each said magnetic element of said rotor is made of non-ferromagnetic material.

15. The magnetic force rotation device of claim 11, wherein said rotor further includes additional permanent magnets in said axial gaps of said permanent magnet of said two magnetic poles of said magnetic elements that faces said radial component air-gap and therein the magnetic field direction of said additional permanent magnets is generally along the circumferential direction about the revolving shaft.

* * * * *